United States Patent [19]

Minakuchi

[11] 4,115,831

[45] Sep. 19, 1978

[54] VELOCITY DETECTING APPARATUS INSENSITIVE TO NOISE

[75] Inventor: Hiroshi Minakuchi, Shiga, Japan

[73] Assignee: Matsushita Electric Industrial Co., Ltd., Osaka, Japan

[21] Appl. No.: 818,859

[22] Filed: Jul. 25, 1977

[30] Foreign Application Priority Data

Aug. 5, 1976 [JP] Japan .................. 51/93645

[51] Int. Cl.² .............................................. H02P 5/00
[52] U.S. Cl. .................................... 361/236; 307/260
[58] Field of Search ................ 73/488, 507, 511, 560; 361/236, 239, 242; 307/239, 260, 269; 324/160, 161, 167

[56] References Cited

U.S. PATENT DOCUMENTS

| | | | |
|---|---|---|---|
| 3,230,437 | 1/1966 | Cappello | 361/236 |
| 3,657,601 | 4/1972 | Darrow | 361/239 |
| 3,952,829 | 4/1976 | Gray | 361/239 |

*Primary Examiner*—Gerald Goldberg
*Attorney, Agent, or Firm*—Stevens, Davis, Miller & Mosher

[57] ABSTRACT

A velocity detecting apparatus comprises a waveform shaping circuit including a first stage switching transistor connected in a rotational speed control loop for a rotary machine, for amplifying and shaping an A.C. signal derived from a velocity sensor and being operated between a saturation region and an active region, a waveform transform circuit having a stable state and a quasi-stable state for a given period after the application of an input signal, for transforming an output signal of the waveform shaping circuit to a square wave having a given duration, an integration circuit for integrating the square wave with time to produce an integrated output, and a comparator for comparing the output voltage of the integration circuit with a reference voltage. In this velocity detecting apparatus, the beginning of the quasi-stable state of the waveform transform circuit is established by the beginning of the active region of the first stage switching transistor of the waveform shaping circuit, and the integration circuit includes first and second series-connected resistors arranged to voltage divide the square wave. One end of an integrating capacitor is connected to the junction of the first and second resistors while the resistances of the first and second resistors are selected such that a duty factor of the square wave during constant velocity control lies between approximately 4/5 and 1/1.

2 Claims, 6 Drawing Figures

VELOCITY DETECTING APPARATUS INSENSITIVE TO NOISE

FIELD OF THE INVENTION

The present invention relates to a velocity detecting apparatus which is very stable to external noise.

DESCRIPTION OF THE PRIOR ART

Figure 1:
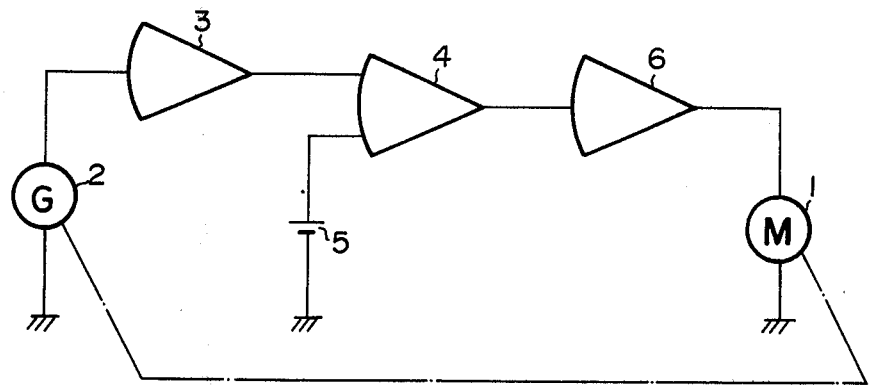
FIG. 1 shows a block diagram of a rotational speed control apparatus for a motor which has been used in the past.

Heretofore, an apparatus as shown in FIG. 1 has been frequently used to detect a rotational speed of a motor for controlling it to a constant speed.

In FIG. 1, numeral 1 denotes a motor whose rotational speed is to be controlled, and numeral 2 denotes a velocity sensor coupled to the motor 1, which velocity sensor has been in many cases an A.C. generator.

An output signal of the velocity sensor 2 is applied to a frequency-D.C. voltage converter circuit 3, an output signal of which is applied to one input terminal of a comparator 4.

A reference voltage source 5 is connected to the other input terminal of the comparator 4 and an output signal of the comparator 4 is applied to an input of a motor drive circuit 6, an output signal of which is applied to the motor 1.

In FIG. 1, the comparator 4 may comprise a differential amplifier and the drive circuit 6 may comprise a D.C. amplifier including a power transistor, all of which have been well known in the art. Therefore, particular circuit configuration is not explained here except the frequency-D.C. voltage converter circuit 3, which will be described in detail.

Figure 2:
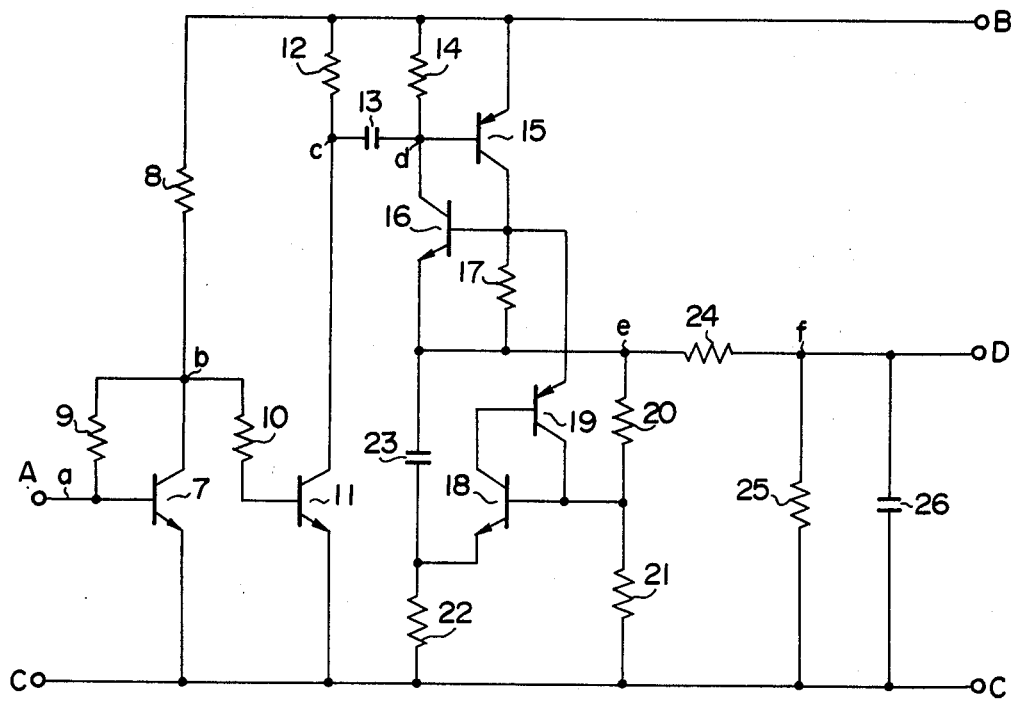
FIG. 2 shows a circuit diagram illustrating one example of a frequency-D.C. voltage converter circuit.

FIG. 2 shows a particular circuit configuration of the frequency-D.C. voltage converter circuit 3 shown in FIG. 1. The A.C. generator acting as the velocity sensor is connected across terminals A and C.

A base-emitter junction of a first switching transistor 7 is also connected across the terminals A and C and a collector of the transistor 7 is connected to a power supply terminal B through a resistor 8. A resistor 9 is connected between base and collector of the switching transistor 7 and the collector thereof is connected to a base of a second switching transistor through a resistor 10.

An emitter of the switching transistor 11 is connected to a common terminal C while a collector thereof is connected to the power supply terminal B through a resistor 12.

A differentiating circuit comprising a capacitor 13 and a resistor 14 is inserted between the collector of the switching transistor 11 and the power supply terminal B and an input of a hook switch comprising transistors 15 and 16 and a resistor 17 is connected to an output of the differentiating circuit. A timing pulse generating circuit comprising transistors 18 and 19, resistors 20, 21 and 22 and a capacitor 23 is inserted between a load terminal of the hook switch, that is, an emitter of the transistor 16 and the common terminal C, and an output of the timing pulse generating circuit, that is, an emitter of the transistor 19 is connected to a base of the transistor 16.

An integration circuit comprising resistors 24 and 25 and a capacitor 26 is connected to the load terminal of the hook switch and an output of the integration circuit is connected to an output terminal D.

Figure 3:
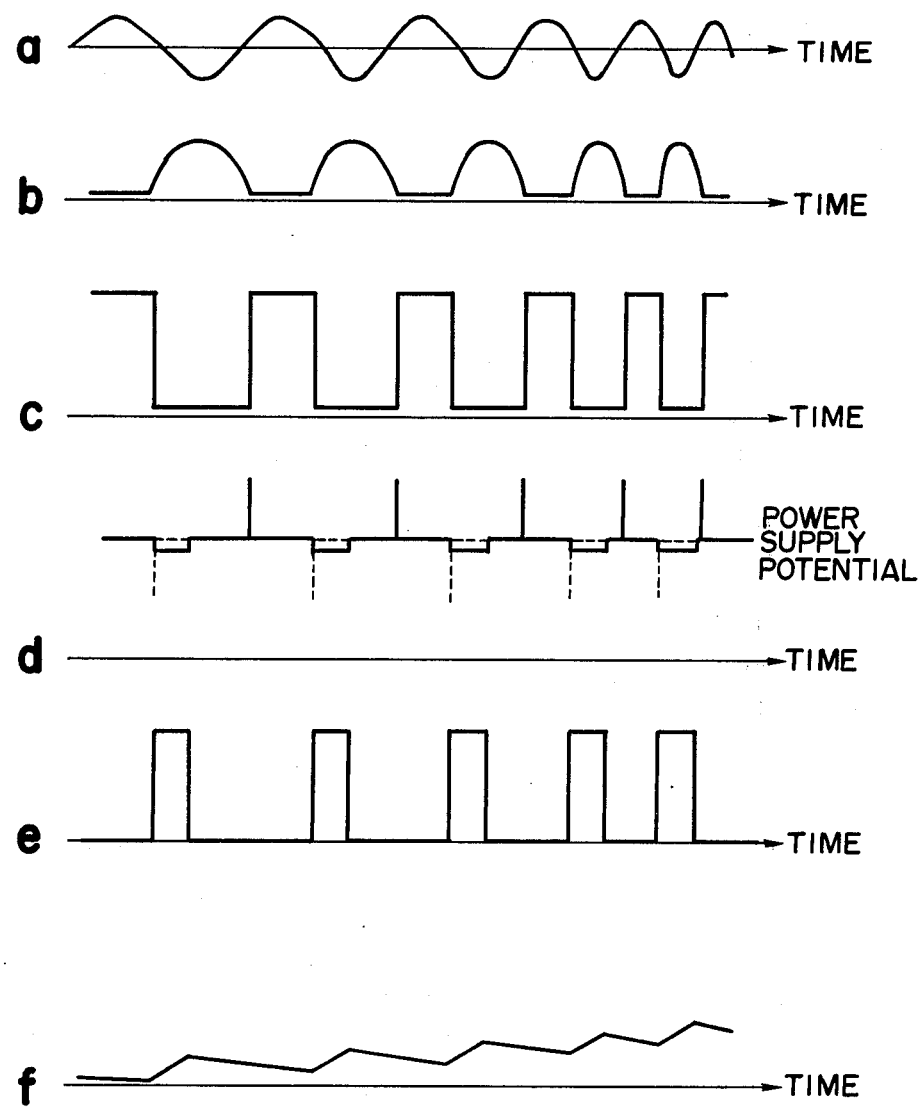
FIGS. 3 and 4 show waveforms for explaining the operation of various sections in FIG. 2.

FIG. 3 shows signal waveforms at various points in FIG. 2. Referring to FIGS. 2 and 3, the operation of the circuit is explained.

The output signal of the A.C. generator is applied across the input terminals A and C. Assuming that the peak amplitude of the voltage is much smaller than a forward base-emitter voltage of the first switching transistor 7 as shown in FIG. 3a (which shows a signal waveform produced when the rotational speed of the motor 1 in FIG. 1 gradually increases), this signal is amplified and shaped by the switching transistor 7 so that a signal waveform as shown in FIG. 3b appears at point b.

This signal waveform is amplified and shaped by the switching transistor 11 so that a square wave as shown in FIG. 3c appears at point c.

This square wave is differentiated by the capacitor 13 and the resistor 14 so that a signal waveform as shown in FIG. 3d appears at point d.

Those portions of the signal waveform shown in FIG. 3d which are negative with respect to the power supply potential are used as trigger pulses for the hook switch so that the hook switch is turned on upon the application of the trigger pulse.

As is well known, once the hook switch is turned on, it is kept on even after the termination of the trigger pulse and the powering to the timing pulse generating circuit connected to the load terminal of the hook switch is initiated.

At this time, the capacitor 23 starts to be charged through the resistor 22 and the transistors 18 and 19 are rendered conductive at the moment when the charged voltage at the capacitor 23 exceeds a sum of a voltage across the resistor 20 and a base-emitter forward voltage of the transistor 18. Thus, a reset signal is applied to the hook switch through the emitter of the transistor 19 so that the hook switch is instantaneously turned off.

Accordingly, the hook switch is shifted from its stable state to its quasi-stable state only for a given time interval from the application of a negative trigger pulse to the hook switch, said time interval being determined by a division ratio of the resistors 20 and 21 and a time constant of the resistor 22 and the capacitor 23. Thus, the hook switch produces a square wave of a given duration. In this manner, the hook switch and the timing pulse generating circuit constitute the waveform transform circuit.

A signal waveform as shown in FIG. 3e appears at point e. This signal waveform is integrated with time by the resistors 24 and 25 and the capacitor 26 so that a signal waveform as shown in FIG. 3f appears at point f.

As will be apparent from the above explanation, when the rotational speed of the motor 1 in FIG. 1 gradually increases, the D.C. voltage at the output terminal of the frequency-D.C. voltage converter circuit shown in FIG. 2 also gradually increases. Accordingly, by properly designing the comparator 4 and the drive circuit 6 such that the inverted signal of the output signal of the frequency-D.C. voltage converter circuit 3 appears at the output of the drive circuit 6, the rotational speed of the motor 1 can be controlled to a speed which makes the output voltage of the frequency-D.C. voltage converter circuit to be substantially equal to the reference voltage.

In such an apparatus, however, there exists a high likelihood that external noise is introduced on connecting lines between the velocity sensor 2 and the control circuit, that is, the frequency-D.C. voltage converter circuit 3, the comparator 4 and the drive circuit 6 in FIG. 1.

The source of the external noise may be spark noise of an adjacent instrument or spark noise of a motor with brushes. The prior art apparatus described above is very sensitive to those noise.

Figure 4:
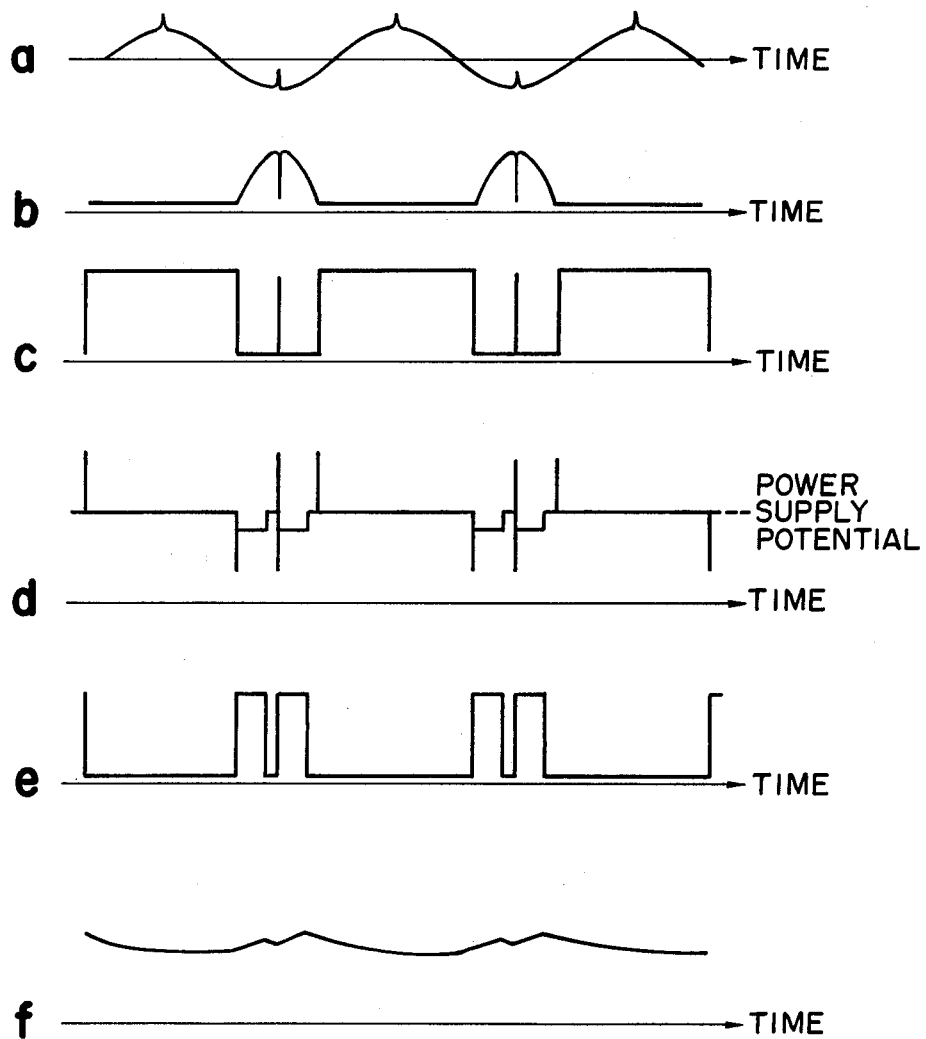

FIG. 4 shows signal waveforms at various points in FIG. 2, similar to those shown in FIG. 3, when external noise is introduced in the input of the frequency-D.C. voltage converter circuit. It is seen that the output voltage waveform $f$ suffers from the influence of the external noise.

Thus, in the prior art velocity detecting apparatus including the apparatus shown in FIG. 1 as well as other apparatus, since the introduction of the external noise causes erroneous operation of the control system, shield wires are used in the connecting lines to prevent the introduction of the external noise or a bypass capacitor is inserted at the input. However, these approaches are not effective to completely eliminate the external noise.

SUMMARY OF THE INVENTION

It is an object of the present invention to overcome the problems encountered in the prior art apparatus and provide a velocity detecting apparatus composed of an electronic circuit, an operating condition of which is established not to suffer from the influence of the external noise even if they are introduced.

According to the velocity detecting apparatus of the present invention, an entire time axis is covered by a saturation region of a first stage transistor of a waveform shaping circuit having insensitive condition to noise or a quasi-stable region of a waveform transform circuit so that the apparatus is very stable to the external noise.

DESCRIPTION OF THE PREFERRED EMBODIMENTS

Figure 5:
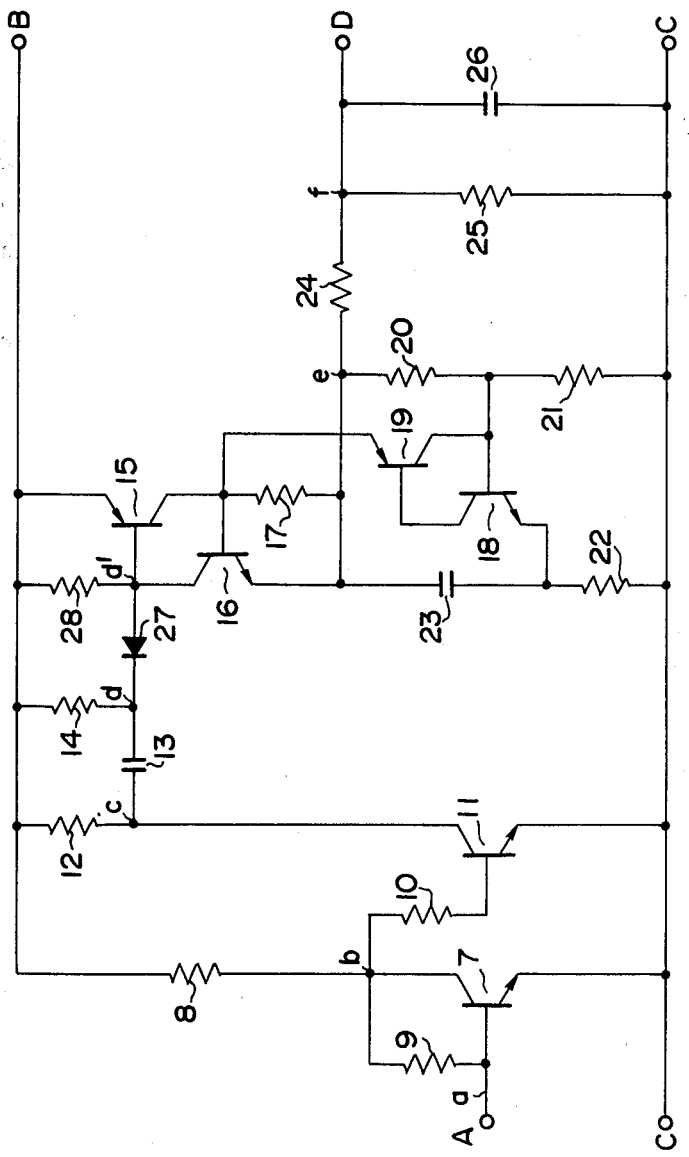
FIG. 5 shows a circuit diagram of a frequency-D.C. voltage converter circuit embodying the present invention.
Figure 6:
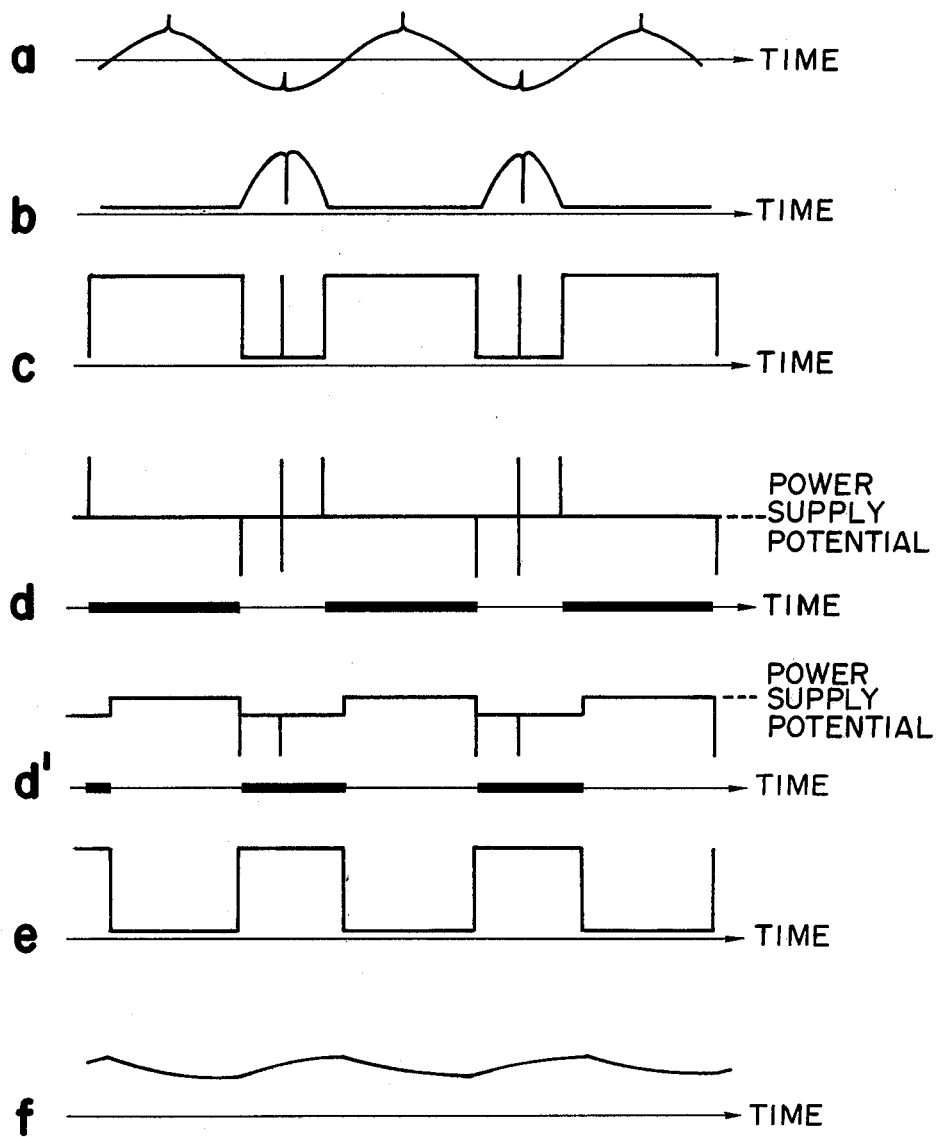
FIG. 6 shows waveforms at various sections in FIG. 5.

FIG. 5 shows a circuit diagram of one embodiment of the velocity detecting apparatus embodying the present invention, and FIG. 6 shows signal waveforms at various points in FIG. 5 when the present invention is applied to the apparatus of FIG. 5.

In FIG. 5, the same parts as in FIG. 2 are designated by the same reference numerals and they are not explained here.

The circuit configuration of FIG. 5 differs for that of FIG. 2 in that a detection circuit comprising a diode 27 and a resistor 28 is connected to the output of the differentiating circuit comprising the capacitor 13 and the resistor 14.

The outline of the present invention is explained with reference to FIG. 6. Like in the case of FIG. 2, waveforms shown in FIGS. 6a to 6c depict those appearing at points $a$ to $c$ in FIG. 5. The signal waveforms shown in FIG. 6 depict those when the external noise has been introduced, as in FIG. 4.

When the signal waveform shown in FIG. 6c is applied to the differentiating circuit in FIG. 5, a differentiated output as shown in FIG. 6d appears at the point $d$ in FIG. 5.

The thick line portions on the time axis in FIG. 6d represent the saturation region of the first stage transistor, that is, the transistor 7 of the waveform shaping circuit.

As described above, when the negative trigger pulse with respect to the power supply potential is applied to the input of the waveform circuit, the waveform transform circuit is shifted from its stable state to its quasi-stable state and shifted back to the stable state after the given time interval determined by the resistors 20, 21 and 22 and the capacitor 23. In the speed control system shown in FIG. 1, the duty factor of the quasi-stable state and the stable state of the waveform transform circuit is uniquely determined by the division ratio of the output square wave and the relation between the power supply voltage and the reference voltage.

By way of example, where the division ratio is 1/1, the power supply voltage is 10 volts and the reference voltage is 2.5 volts, the duty factor is 1/1.

More particularly, as described above, this type of control system maintains a constant speed control in such a manner that the output voltage of the frequency-D.C. voltage converter circuit 3, that is, the output voltage of the integration circuit is substantially equal to the reference voltage. Accordingly, when the D.C. voltage of 2.5 volts is derived by integrating the square wave having an amplitude which is one half of the power supply voltage, the duty factor of the square wave is 1/1.

The resistances of the resistors 24 and 25 and the relation between the power supply voltage and the reference voltage are properly selected such that the quasi-stable region of the waveform transform circuit is longer than non-saturation region of the transistor 7.

With this design, the quasi-stable region of the waveform transform circuit is established from the beginning of the active region of the first stage transistor of the waveform shaping circuit to an intermediate point of the saturation region.

In the saturation region of the first stage transistor of the waveform shaping circuit, that is, the transistor 7, an impedance at the terminal A is very low and positive portions of the input signal are clipped at a constant level at the output. In addition, with the aid of a minority carrier storage effect of the transistor 7, the circuit does not suffer from the influence of external noise even if it is introduced.

Furthermore, while the waveform transform circuit is in its quasi-stable state, the circuit is insensitive to negative input signals with respect to the power supply potential. Thus, by blocking the positive input signals by the detection circuit, the circuit does not suffer from the influence of external noise during the quasi-stable state of the waveform transform circuit.

As a result, signal waveforms as shown in FIGS. 6d' and 6e appear at points $d'$ and $e$ in FIG. 5.

The thick line portions on the time axis of FIG. 6d' represent the quasi-stable regions of the waveform transform circuit.

In this manner, a signal waveform as shown in FIG. 6f appears at point $f$ in FIG. 5. It is seen from the figure that the signal waveform does not suffer from the influence of external noise. Thus, by applying the present invention to the speed control system shown in FIG. 2, a stable control which is not influenced by external noise can be attained.

In the signal waveforms shown in FIG. 6, the duty factor of the output square wave of the waveform transform circuit is selected to approximately 4/5. An advantageous effect is obtained when the duty factor lies between approximately 4/5 to 1/1.

The reason therefor is explained below. Under a proper biasing condition (that is, a biasing condition which allows a maximum amplification gain) of the switching transistor 7 in which the operating point reciprocates between the saturation region and the active region, a ratio of the saturation region to the active region for a small input signal is around 3/6. Further, if the duty factor exceeds 1/1, that is, if the quasi-stable region is longer than the stable region, there is a risk that a second trigger pulse may be included in the quasi-stable region.

While the velocity control apparatus shown in FIG. 1 includes a separate reference voltage source for comparison, the reference voltage may be in many cases derived by dividing the power supply voltage. In this case, when third and fourth resistors (not shown but connected between B and C) are used as the resistors for dividing the power supply voltage and the first and second resistors 24 and 25 are used as the resistors for dividing and integrating the output square wave of the waveform transform circuit, the duty factor of the square wave is independent of the power supply voltage and it is uniquely determined by the division ratio of the first and second resistors and the division ratio of the third and fourth resistors.

While the velocity detecting apparatus of FIG. 5 includes the differentiating circuit and the detection circuit between the output of the second switching transistor 11 and the waveform transform circuit, the detection circuit may be eliminated when a trigger pulse generating circuit which generates one of positive and negative trigger pulse (negative pulse in the example of FIG. 5) is connected between the output of the switching transistor and the waveform transform circuit, and the trigger pulse generating circuit may be eliminated when the waveform transform circuit is provided with the function of differentiating the input signal (e.g. a digital IC monostable circuit).

The application of the velocity detecting apparatus of the present invention is not limited to FIG. 1 and FIG. 5 but it may be applicable to any other velocity control system. Furthermore, any frequency-D.C. voltage converter citcuit comprising a waveform shaping circuit including a first stage switching transistor an operating point of which is reciprocated between a saturation region and an active region and a waveform transform circuit having a stable state and a quasi-stable state may be used in the present invention.

What is claimed is:
1. A velocity detecting apparatus comprising;
    a waveform shaping circuit including a first stage switching transistor connected in a rotational speed control loop for a rotary machine, for amplifying and shaping an A.C. signal derived from a velocity sensor, said switching transistor being operated between a saturation region and an active region;
    a waveform transform circuit having a stable state and a quasi-stable state for a given period after the application of an input signal, for transforming an output signal of said waveform shaping circuit to a square wave having a given duration;
    an integration circuit for integrating said square wave with time to produce an integrated output; and
    a comparator for comparing said output voltage of said integration circuit with a reference voltage;
    wherein;
    the beginning of said quasi-stable state of said waveform transform circuit is established by the beginning of said active region of said first stage switching transistor of said waveform shaping circuit;
    said integration circuit includes first and second series-connected resistors arranged to voltage divide said square wave;
    one end of an integrating capacitor is connected to the junction of said first and second resistors; and
    the resistances of said first and second resistors are selected such that a duty factor of said square wave during constant velocity control lies between approximately 4/5 and 1/1.
2. A velocity detecting apparatus according to claim 1 wherein a feed line connected to said waveform transform circuit is divided by third and fourth resistors and a voltage divided thereby is used as said reference voltage of said compare circuit constituting said rotational speed control loop.

* * * * *